United States Patent [19]

Harper

[11] Patent Number: 4,813,532
[45] Date of Patent: Mar. 21, 1989

[54] NATURAL FREQUENCY VIBRATORY CONVEYOR

[75] Inventor: Chester H. Harper, Aurora, Oreg.

[73] Assignee: Allen Fruit Co., Inc., Newberg, Oreg.

[21] Appl. No.: 144,929

[22] Filed: Jan. 15, 1988

[51] Int. Cl.⁴ .............................................. B65G 27/28
[52] U.S. Cl. .................................... 198/760; 198/761; 198/763; 198/767
[58] Field of Search ............... 198/760, 761, 767, 759, 198/763, 766

[56] References Cited

U.S. PATENT DOCUMENTS

| Re. 28,484 | 7/1975 | Musschoot | 198/760 |
|---|---|---|---|
| 2,333,338 | 11/1943 | Rapp | 198/767 X |
| 2,334,368 | 11/1943 | Wolf . | |
| 2,358,876 | 9/1944 | Overstrom | 198/767 |
| 2,447,311 | 8/1948 | Burt . | |
| 2,664,995 | 1/1954 | Rennner | 198/760 |
| 2,678,720 | 5/1954 | Brumagin | 198/760 |
| 2,772,769 | 12/1956 | Behnke et al. | 198/761 |
| 2,936,064 | 5/1960 | Schuessler | 198/760 |
| 2,984,339 | 5/1961 | Musschoot . | |
| 2,993,585 | 7/1961 | Musschoot . | |
| 3,080,961 | 3/1963 | Allen et al. | 198/761 X |
| 3,112,823 | 12/1963 | Musschoot | 198/767 X |
| 3,253,701 | 5/1966 | Evans . | |
| 3,335,861 | 8/1967 | Musschoot et al. | 198/761 X |
| 3,338,384 | 8/1967 | Carrier, Jr. . | |
| 3,476,234 | 11/1969 | Allen et al. . | |
| 3,542,186 | 11/1970 | Allen et al. . | |
| 4,162,778 | 7/1979 | Kraft | 198/760 X |

Primary Examiner—Robert J. Spar
Assistant Examiner—D. Glenn Dayoan
Attorney, Agent, or Firm—Chernoff, Vilhauer, McClung & Stenzel

[57] ABSTRACT

A natural frequency vibratory conveyor which substantially improves upon the slow starting and stopping times and the power requirements associated with prior art natural systems is disclosed. The conveyor employs a drive member reciprocatively connected at one end to a drive motor assembly and resiliently connected at the opposite end to the conveyor platform. The conveyor can be operated at unusually high natural frequencies of vibration, thereby achieving high production rates, by employing opposed, adjustable springs to establish a high bidirectional spring rate between the conveyor platform and the base. Undesirable vertical components of vibration can thus be reduced without sacrificing productivity due to the high natural frequency.

16 Claims, 1 Drawing Sheet

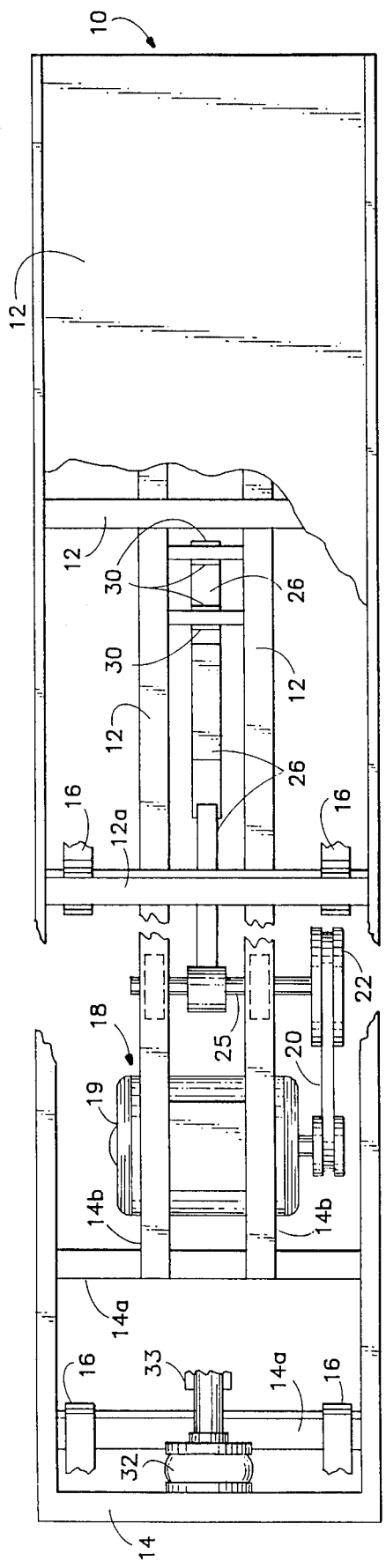
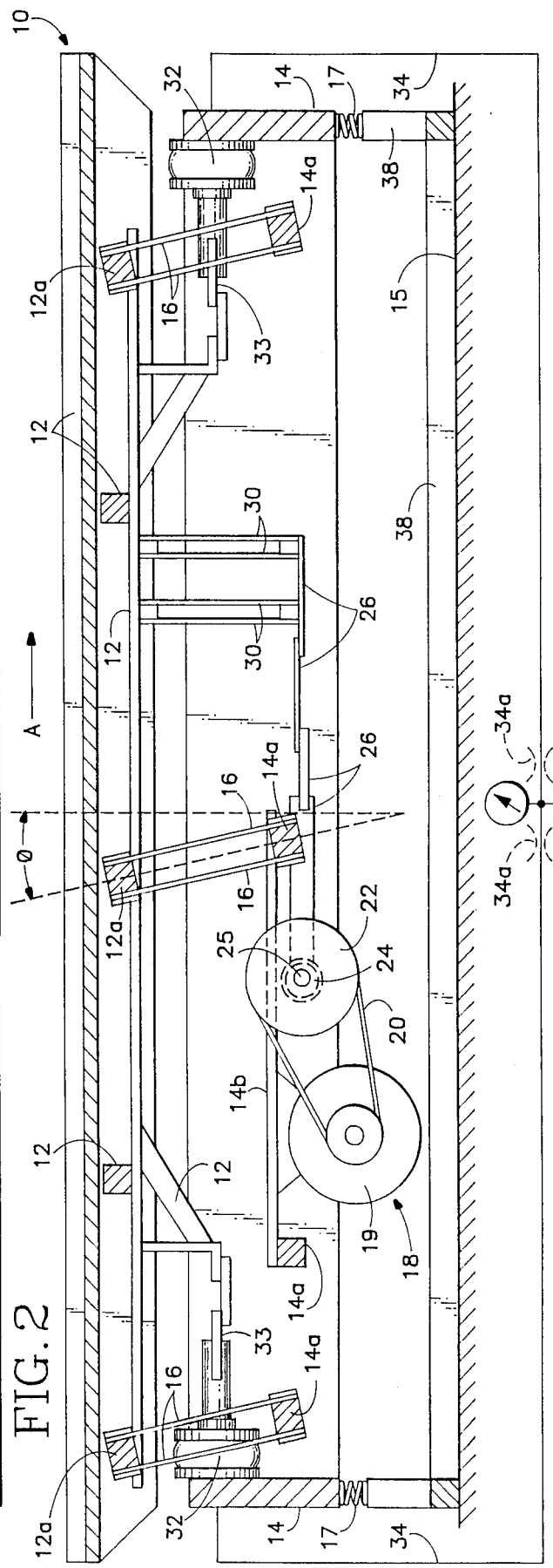
FIG.2
FIG.1

NATURAL FREQUENCY VIBRATORY CONVEYOR

BACKGROUND OF THE INVENTION

The present invention relates to tunable vibratory materials-handling conveyors wherein the spring rate of the vibrating platform is variably regulated by one or more adjustable springs to match the natural frequency of the platform with the fixed frequency of the drive. When such frequencies are substantially matched, most of the movement of the conveyor platform is due to free vibration rather than to forced vibration, thereby driving the system at the minimal power necessary to overcome friction and/or damping.

Some prior art vibratory conveyors, such as those shown in U.S. Pat. Nos. 2,334,368 to Wolf, 2,447,311 to Burt, and 3,476,234 and 3,542,186 to Allen et al., teach variable adjustment of the frequency of a reciprocating drive to bring the drive frequency into correspondence, or near correspondence, with the natural or resonant frequency of the vibratory platform of the conveyor. These adjustable-drive frequency systems, however, cannot consistently be operated at resonance, primarily due to the difficulty in controlling the speed of the drive motor accurately and consistently over normal periods of operation.

Other prior art natural frequency vibratory conveyors variably adjust the natural frequency of the vibratory platform to match a fixed drive frequency. These conveyors typically employ one of the following two alternative types of drives: (1) an eccentric counterweight drive as disclosed in U.S. Pat. Nos. 2,984,339 and 2,993,585 to Musschoot, 3,253,701 to Evans, and 3,338,384 to Carrier, Jr.; or (2) a direct, forced-vibration drive as shown in Musschoot U.S. Pat. No. 2,984,339 at FIG. 14.

Prior art conveyors having platforms with adjustable natural frequencies and driven by eccentric counterweighted drives are slow to start and stop, as a result of the power required to accelerate and decelerate the large counterweight masses, thereby hindering precise controllability of the conveyor. Eccentric counterweights can also induce undesired horizontal "walking" vibrations in the base, as well as vertical vibrations which are transmitted to the floor and which can cause structural damage to the building housing the conveyor, particularly at low frequencies close to the natural frequency of the building. Unfortunately, such low frequencies are characteristic of these drives because of the high power levels necessary to drive large eccentric masses at higher frequencies. Because of the power limitation on the frequencies of these drives, high productivity of their respective conveyors requires that the supporting leaf springs of the vibratory platforms be placed at a large enough angle relative to vertical to produce a substantial vertical component in the amplitude of the platform to increase material "throw". This maximizes vertical vibratory reaction forces directed into the floor of the building, thereby causing further structural stress while also imposing high forces on the material being conveyed which, if fragile, can be bruised or broken by excessive vibratory force.

On the other hand, vibratory conveyor platforms having adjustable natural frequencies and driven by direct, forced-vibration drives, as seen for example in FIG. 14 of the Musschoot '339 patent, have all the disadvantages previously discussed in connection with counterweighted drive systems because the direct, fixed connection of a motor-driven reciprocating drive member to the conveyor platform is equivalent to the connection of the motor to a large counterweight. Also, in direct-drive vibratory systems, the amplitude and vibratory frequency of the platform are always the same as those of the drive member because of the direct, fixed connection. This prevents the amplitude of the vibratory platform from becoming magnified at resonance relative to the amplitude of the drive member, thereby requiring that the drive member have a large reciprocating amplitude. This construction also makes it difficult to determine visually whether or not the natural frequency of the platform is properly adjusted to match the frequency of the drive, and whether the natural frequency of the platform is being maintained at proper adjustment during operation when affected by variables tending to change the natural frequency of the platform, such as the mass of material being conveyed or wear-induced changes in spring rate.

Prior art conveyors such as those disclosed in the Musschoot, Evans and Carrier, Jr. patents teach the use of adjustable air springs in orientations having a significant vertical component, for adjusting the natural frequency of the vibratory platform. Such orientations, however, contribute to the undesired transmission of significant vertical vibrations through the air springs into the floor.

Such prior art natural frequency conveyors also do not provide adjustable springs capable of applying high, bidirectional spring rates to the vibratory platform to enable the platform's natural frequency to be at a relatively high value, as needed to achieve high production rates without necessitating harmfully large vertical amplitudes of vibration. In FIGS. 1 and 2 of the Musschoot '339 patent, for example, because opposed adjustable air springs are interposed between a horizontally-floating subframe and the platform, they cannot exercise sufficient control over the natural frequency of the platform to raise its natural frequency to the high level desired. On the other hand, adjustable air springs such as those shown in FIG. 14 of the Musschoot '339 patent, and in the Musschoot '585 patent, although interposed between a horizontally-restrained base and the vibratory platform, are not in opposed relationship to each other and therefore likewise cannot provide high adjustable spring rates in both directions of vibration. None of these adjustable springs, therefore, is capable of increasing the natural frequency of vibration of the platform to the high values needed to produce high production rates without high amplitudes of vibration.

SUMMARY OF THE INVENTION

The present invention is directed to a natural frequency vibratory conveyor which can, without high power consumption, be operated at higher frequencies of vibration than in the prior art so as to achieve high production rates while minimizing vibrational amplitudes harmful both to the building structure housing the conveyor and to fragile material being conveyed. The invention enhances the advantages of lower power input and reduced mechanical wear, associated with natural vibratory systems, by minimizing the load on the drive system under both resonant and nonresonant conditions, and improves system controllability by enabling fast stopping and starting.

The invention accomplishes these objectives in part by employing a drive member reciprocatively connected both to a drive motor and to the vibratory conveyor platform, in combination with adjustable springs for variably adjusting the natural frequency of the platform to match the fixed frequency of he drive member. Such a drive system eliminates the large counterweight masses and the fixed, direct-drive connection between the drive motor and the conveyor platform, as employed in the previous adjustable-frequency platform systems described above, and thereby substantially improves upon the slow starting and stopping times associated with such prior art systems while enabling high vibratory frequencies to be obtained with low power input. The elimination of eccentric counterweight masses also substantially reduces horizontal "walking" vibrations induced in the conveyor base, and vertical vibrations transmitted through the base into the floor. Further, the attainment of higher frequencies reduces the need for a substantial upward component in the platform's amplitude to achieve high production rates, thereby further reducing vertical vibratory reaction forces created by prior art devices. The present invention has the further advantage, over previous natural frequency direct-drive systems, of enabling the natural frequency of the platform to be visually tunable so that it is immediately obvious to the operator whether or not the natural frequency of the platform is properly adjusted to match the frequency of the drive, permitting him to make timely corrections when necessary during operation.

The need to limit vertical vibratory forces is further satisfied by employing adjustable springs having a substantially horizontal orientation to oppose relative motion between the platform and the base, thereby transmitting only a nominal vertical component of vibration into the floor.

The objective of increasing the platform's natural frequency of vibration, so as to obtain higher production rates without a large vertical component of vibration, is further achieved by connecting the adjustable springs in an opposed, compressive relationship to each other interposed between the platform and a horizontally-restrained base. Such configuration enables the springs to provide high adjustable spring rates in both directions of reciprocation of the vibratory platform, thereby enabling the exercise of sufficient control over the natural frequency of the platform to raise its natural frequency to the higher levels desired.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a sectional, partially schematic side view of a preferred embodiment of a natural frequency vibratory conveyor in accordance with the present invention.

FIG. 2 is a top view, partially broken away, of the natural frequency vibratory conveyor of FIG. 1.

DESCRIPTION OF THE PREFERRED EMBODIMENT

Referring to the drawings, a preferred embodiment of the present invention is shown as comprising a conveyor 10 for the transport of materials such as snack foods, fresh produce, granulated products, and the like. A substantially horizontal platform 12 for supporting and vibratingly feeding materials is resiliently connected to a base 14, having a mass roughly four times that of the platform, by means of a plurality of supporting leaf springs 16 extending between platform cross members 12a and base cross members 14a. The leaf springs 16 are preferably placed at a minimum angle $\theta$ (e.g. about 15°) relative to vertical and opposed to the direction A of material transport. The base 14 is supported on the floor 15 by coil springs 17 for the purpose of providing vertical resilience while restricting horizontal movement of the base relative to the floor independently of any connection between the base and the platform 12.

A rotary drive motor assembly 18 is secured by base cross members 14a and base longitudinal members 14b to the base 14. The drive motor assembly 18 comprises a rotary electric motor 19 connected by a drive belt 20 to a pulley 22 which drives a shaft 25 having an eccentric journal 24 affixed thereto. A drive member 26 is reciprocatively connected both to the drive motor assembly 18 by engagement with the journal 24, and to the platform 12 by means of resilient vertical leaf springs 30 which yieldably oppose the reciprocative motion of the drive member relative to the platform. The leaf springs 30 preferably have a combined spring rate less than that of the combined leaf springs 16.

A pair of horizontally-oriented inflatable air springs 32 interconnect the platform 12 with the base 14 by connectors 33, and are in opposed compressive relationship to each other. The air springs 32 communicate in parallel through gas conduits 34 with a common source 35 of compressed air to equalize their spring rates. The gas conduits 34 include restriction means, indicated schematically as 34a, for limiting the transfer of air between the air springs 32 so as to maintain substantial equality of the spring rates during vibration. Conventional restrictors may be used for this purpose or, preferably, the conduits 34 may simply have restricted passageways throughout their lengths which are less susceptible to clogging than are conventional restrictors.

The apparatus as shown in FIG. 1 further includes control means for variably regulating the pressure of the air within the air springs 32. A pair of adjustable, relieving pressure regulator valves 37 and 37a are connected in series between the source 35 of compressed air and the air springs 32. The first valve 37a in the series is a safety valve set to the highest allowable pressure setting of the air springs 32. The second valve 37 in the series is the valve for variably regulating the actual pressure within the air springs.

In operation, the drive motor assembly 18 rotates at a substantially constant, fixed speed, thereby reciprocating the drive member 26 substantially horizontally at a constant, fixed frequency equal to the desired vibratory frequency of the platform 12 when operating at maximum production (e.g. 1050 cycles per minute). The reciprocating action of the drive member 26 is transmitted by vertical leaf springs 30 to the platform 12. The resultant reciprocating action of platform 12 includes a vertical component of amplitude proportional to angle $\theta$. This angle can be minimized in the present invention, without sacrificing productivity, due to the high reciprocating frequency of the platform 12 made possible by the high bidirectional spring rate provided by the opposed air springs 32, thereby reducing the undesirable vertical vibratory reaction forces directed into the floor 15 and into the material being conveyed. The small vertical amplitude of the platform 12 is accommodated structurally within the conveyor 10 by limited vertical resiliency of both the drive member 26 and the connectors 33.

Initially, when the conveyor is started, the air springs 32 are depressurized by minimizing the pressure setting of valve 37, thereby lowering the natural vibratory frequency of the platform to a value (e.g. 950 cycles per minutes determined primarily by the combined spring rates of the leaf springs 16) which is below the fixed reciprocative frequency (e.g. 1050 cycles per minute) of the drive member 26. Under such conditions, the amplitude of vibration of the platform 12 will be relatively small. To bring the system into resonance for optimum performance, the operator merely increases the pressure setting of valve 37 gradually while the platform 12 is reciprocating, thereby increasing the effective platform spring rate and thus the natural frequency of the platform. As the pressure in the air springs is increased, the amplitude of vibration of the platform will increase to a maximum where the natural vibratory frequency of the platform matches the frequency of the drive member 26. Further increases in air spring pressure, causing the platform's natural frequency to exceed the frequency of the drive member, will result in a reduction in platform amplitude from the maximum. Accordingly, the resonant point will be easily identifiable visually as the point of maximum amplitude of the platform 12, and air spring pressure corrections can thereafter be made during operation as necessary to maintain such maximum amplitude.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A natural frequency vibratory conveyor comprising:
    (a) a base;
    (b) a substantially horizontal platform movably connected to said base for supporting and vibratingly feeding materials;
    (c) a drive motor assembly secured to said base and connected to said platform by a reciprocative drive member;
    (d) adjustable spring means interconnecting said platform with said base independently of said drive member; and
    (e) control means for variably regulating the spring rate of said adjustable spring means so as to adjust the natural vibratory frequency of said platform to match substantially the reciprocative frequency of said drive member;
    (f) said adjustable spring means being oriented so as to exert an adjustable spring force, opposing relative motion between said platform and said base, substantially solely in a horizontal direction.

2. The apparatus of claim 1 wherein said drive member is resiliently connected to said platform so as to yieldably oppose said relative movement of said drive member with respect to said platform.

3. The apparatus of claim 1 wherein said adjustable spring means comprises a pair of opposed adjustable springs.

4. The apparatus of claim 3 wherein said pair of opposed adjustable springs are in opposed compressive relationship to each other and provide equal opposed adjustable spring rates.

5. The apparatus of claim 1 wherein said drive motor assembly is of a rotary type and said drive member is eccentrically connected to said drive motor assembly.

6. The apparatus of claim 1 wherein said drive member is connected to said platform by means of one or more leaf springs.

7. The apparatus of claim 1 wherein said adjustable spring means comprises inflatable pneumatic springs, and said control means comprises means for variably regulating the pressure of a gas within said pneumatic springs.

8. The apparatus of claim 7 wherein said pneumatic springs comprise a pair of opposed pneumatic springs interconnected in parallel with a source of pressurized gas.

9. The apparatus of claim 8 wherein said pneumatic spring are interconnected by gas conduits having restriction means for limiting the transfer of gas between said pneumatic springs.

10. The apparatus of claim 7 wherein said control means comprises an adjustable, receiving pressure regulator valve connected in series between a source of compressed gas and said pneumatic springs.

11. A natural frequency vibratory conveyor comprising:
    (a) a base;
    (b) a substantially horizontal platform movably connected to said base for supporting and vibratingly feeding materials;
    (c) a drive motor secured to said base and connected to said platform by a reciprocative drive member;
    (d) adjustable spring means interconnecting said platform with said base independently of said drive member for exerting an adjustable spring force opposing relative motion between said platform and said base; and
    (e) control means for variably regulating the spring rate of said adjustable spring means so as to adjust the natural vibratory frequency of said platform to match substantially the reciprocative frequency of said drive member;
    (f) said adjustable spring means comprising a pair of adjustable springs, each interconnecting said platform with said base, in opposed compressive relationship to each other and providing opposed adjustable spring rates, and said base comprising base supporting means for restricting horizontal movement of said base independently of any connection between said base and said platform.

12. The apparatus of claim 11 wherein said adjustable springs are oriented so as to exert an adjustable spring force opposing relative motion between said platform and said base substantially solely in a horizontal direction.

13. A method of driving a vibratory conveyor comprising the steps of:
    (a) providing a substantially horizontal platform connected to a base by a resilient connection;
    (b) vibrating said platform by driving a motor assembly mounted on said base and reciprocating a drive member interconnecting said platform and said motor assembly;

(c) while vibrating said platform, variably regulating the spring rate of the resilient connection between said platform and said base so as to maintain the natural vibratory frequency of said platform substantially equal to the reciprocative frequency of said drive member; and (d) connecting said drive member reciprocatively both to said motor assembly and to said platform so as to permit relative movement of said drive member with respect to both said motor assembly and said platform in the direction of reciprocation of said drive member, including resiliently connecting said drive member to said platform so as to yieldably oppose said relative movement of said drive member with respect to said platform while permitting the amplitude of vibration of said platform to be magnified relative to the reciprocative movement of said drive member; and (e) restricting horizontal movement of said base independently of any connection between said base and said platform.

14. A method of driving a vibratory conveyor comprising the steps of:

(a) providing a substantially horizontal platform connected movably to a base;

(b) vibrating said platform by reciprocating a drive member connected to said platform;

(c) resiliently interconnecting said platform with said base independently of said drive member by interposing an adjustable spring assembly between said platform and said base; and (d) orienting said spring assembly so as to exert an adjustable spring force opposing relative motion between said platform and said base substantially solely in a horizontal direction and variably adjusting the spring rate of said spring assembly in said horizontal direction so as to adjust the natural vibratory frequency of said platform to match substantially the reciprocative frequency of said drive member.

15. A method of driving a vibratory conveyor comprising the steps of:

(a) providing a substantially horizontal platform connected movably to a base;

(b) vibrating said platform by reciprocating a drive member connected to said platform;

(c) resiliently interconnecting said platform with said base independently of said drive member by interposing each of a pair of adjustable springs, in opposed compressive relationship to each other, between said platform and said base so as to oppose relative motion between said platform and said base;

(d) variably adjusting said springs to provide opposed spring rates so as to adjust the natural vibratory frequency of said platform to match substantially the reciprocative frequency of said drive member; and (e) restricting horizontal movement of said base independently of any connection between said base and said platform.

16. The method of claim 15 wherein step (c) further comprises orienting said adjustable springs so as to exert an adjustable spring force opposing relative motion between said platform and said base substantially solely in a horizontal direction.

* * * * *

UNITED STATES PATENT AND TRADEMARK OFFICE
CERTIFICATE OF CORRECTION

PATENT NO. : 4,813,532
DATED : March 21, 1989
INVENTOR(S) : Chester H. Harper It is certified that error appears in the above-identified patent and that said Letters Patent is hereby corrected as shown below:

| | |
|---|---|
| In the Abstract: | After "natural" insert --frequency--. |
| Col. 3, Line 6 | Change "he" to --the--. |
| Col. 6, Line 24 | Change "spring" to --springs--; |
| Line 28 | Change "receiving" to --relieving--. |
| Col. 8, Lines 15-16 | Change "inter posing" to --inter-posing--. |

Signed and Sealed this

Second Day of October, 1990

Attest:

HARRY F. MANBECK, JR.

*Attesting Officer*  *Commissioner of Patents and Trademarks*